(12) United States Patent
Guthery

(10) Patent No.: US 7,194,628 B1
(45) Date of Patent: Mar. 20, 2007

(54) METHODS AND SYSTEMS FOR GROUP AUTHENTICATION USING THE NACCACHE-STERN CRYPTOSYSTEM IN ACCORDANCE WITH A PRESCRIBED RULE

(75) Inventor: Scott B. Guthery, Newton, MA (US)

(73) Assignee: Mobile-Mind, Inc., Watertown, MA (US)

( * ) Notice: Subject to any disclaimer, the term of this patent is extended or adjusted under 35 U.S.C. 154(b) by 834 days.

(21) Appl. No.: 10/426,256

(22) Filed: Apr. 29, 2003

Related U.S. Application Data

(60) Provisional application No. 60/421,750, filed on Oct. 28, 2002, provisional application No. 60/423,256, filed on Nov. 1, 2002.

(51) Int. Cl.
*H04L 9/00* (2006.01)
(52) U.S. Cl. .................. 713/168; 713/171; 713/175
(58) Field of Classification Search ................ 713/168
See application file for complete search history.

(56) References Cited

U.S. PATENT DOCUMENTS

| | | | |
|---|---|---|---|
| 5,910,989 | A | 6/1999 | Naccache |
| 5,946,397 | A | 8/1999 | M'Raihi et al. |

OTHER PUBLICATIONS

An Improved Anonymous ID-Based Key Issuing Protocol Yongquan Cai; Xiang Yan; Innovative Computing, Information and Control, 2006. ICICIC '06. First International Conference on vol. 1, 30-01 Aug. 2006 pp. 472-475.*
Research directions for automated software verification: using trusted hardware Devanbu, P.; Stubblebine, S.; Automated Software Engineering, 1997. Proceedings., 12th IEEE International Conference Nov. 1-5, 1997 pp. 274-279.*
Cryptographically secure identity certificates Kirovski, D.; Jojic, N.; Acoustics, Speech, and Signal Processing, 2004. Proceedings. (ICASSP '04). IEEE International Conference on vol. 5, May 17-21, 2004 pp. V-413-V-416 vol. 5.*

(Continued)

*Primary Examiner*—David Jung
(74) *Attorney, Agent, or Firm*—Jacobs & Kim LLP; David A. Jacobs

(57) ABSTRACT

A method for group authentication using a public key cryptosystem that includes a public key and a private key, comprising the steps of providing a Private Key Share to a Tool of each Entity of each Group encompassed by a Boolean Expression of a prescribed Rule based upon the private key, encrypting a random number using the public key of the public key cryptosystem to generate a ciphertext challenge at a Verification Device, conveying the ciphertext challenge to the Tool of each Entity in communication with the Verification Device, generating a response to the ciphertext challenge using the Private Key Share of the Tool of each Entity in communication with the Verification Device, transmitting the response generated by each Entity in communication with the Verification Device to the Verification Device, combining the responses received from the Entities in communication with the Verification Device, determining whether any combination of the responses equals the random number wherein any combination that equals the random number identifies an Authenticated Group and any combination that does not equal the random number identifies a non-authenticated Group, and effecting an apposite course of action with respect to an Operation governed by the prescribed Rule based upon the outcome of the determining step.

38 Claims, 6 Drawing Sheets

OTHER PUBLICATIONS

Benaloh et al., Generalized Secret Sharing and Monotone Functions, Advances in Cryptology, Spring-Verlag, 1990, pp. 27-35.

Guthery, Group Authentication Using the Naccache Stern Public-Key Cryptosystem, 2003.

Naccache et al., A New Public-Key Cryptosystem, Advances in Cryptology—EUROCRYPT '97, Lecture Notes in Computer Science, 1997, Berlin, Germany.

Shamir, How to Share a Secret, Communications for the ACM, Nov. 1979, pp. 612-613.

* cited by examiner

METHODS AND SYSTEMS FOR GROUP AUTHENTICATION USING THE NACCACHE-STERN CRYPTOSYSTEM IN ACCORDANCE WITH A PRESCRIBED RULE

CROSS-REFERENCE TO RELATED APPLICATIONS

This application is based upon and claims priority from U.S. provisional patent application Ser. No. 60/421,750, filed 28 Oct. 2002, entitled GROUP AUTHENTICATION METHOD AND SYSTEM, and U.S. provisional patent application Ser. No. 60/423,256, filed 1 Nov. 2002, entitled GROUP AUTHENTICATION METHOD AND SYSTEM.

BACKGROUND OF THE INVENTION (1) Field of the Invention

The present invention relates to the use of cryptographic systems for authentication, and, more particularly, to methods and systems using the Naccache-Stern Cryptosystem for group authentication in accordance with a prescribed rule or policy ("rule/policy") statement formulated as a Boolean Expression that authorizes access to a protected resource or performance of a restricted operation governed by the prescribed rule/policy statement by authenticated groups.

(2) Description of Related Art

The use of cryptographic systems to protect the security of information is well known in the art. These cryptographic systems involve an encryption algorithm and key to convert cleartext/plaintext into ciphertext (encryption), which can then be transmitted over any secure or insecure communications links, and a decryption algorithm and key for reconverting received ciphertext to cleartext/plaintext. Such cryptographic systems can either be symmetric, i.e., each entity has a copy of a common secret key, or asymmetric, i.e., only one entity possesses a private key, but the associated public key is made readily accessible to others, e.g., the public at large.

Traditional cryptographic systems have typically relied upon the common secret key system (symmetric cryptography) for the encryption and decryption of information transmitted over non-secure communications networks. There are distinct drawbacks to the use of symmetric cryptographic systems—perhaps the largest of which is the secure distribution of the common secret key(s) to intended recipient(s), particularly where the recipient audience is large. Another drawback is that if any copy of the common secret key is discovered or intercepted by an unintended entity, the confidentiality and authentication capability of the symmetric cryptographic system is effectively compromised, and new common secret keys would need to be generated and copies distributed to users.

In asymmetric or public key cryptography, the public and private keys are created simultaneously using the same algorithm. The private key is securely held by the entity that needs to decrypt data and/or authenticate its identity while the public key is made generally accessible to the public, e.g., as part of a digital certificate posted on a web site. Any entity can encrypt a message or document using the entity's public key so that only the entity possessing the private key can decrypt the message or document. The public key cryptographic system can also be used for entity authentication, i.e., the positive identification of one entity by another. For this scenario, the entity holding the private key uses it to transmit an encrypted signature, which is decrypted by the receiving entity using the corresponding public key. Successful decryption using the public key demonstrates the possession of the associated private key by the sender of the signature, and, therefore, the identity of the sender.

In a similar manner, public key cryptographic systems such as the Rivest-Shamir-Adleman (RSA) public key cryptographic system can be used for group authentication. There are many contexts in which a prescribed rule/policy defines one or more groups, wherein each group can be made up of one or more entities, that are authorized access to a protected resource and/or to perform a particular restricted function, task, action, transaction, or operation (collectively "operation"). For example, supervisory control and security concerns may dictate a prescribed rule/policy in connection with access to and use of any restricted facility and/or resources, e.g., a computer center's resources (the operation) that dictates that there must always be at least two employees, at least one of whom must be a manager, before access and use of the computer centers' resources is authorized. This rule/policy can be formulated as a Boolean Expression as follows (wherein $ME_i$ designates a managerial employee and $NME_j$ designates a non-managerial employee:

$$(ME_1 \text{ AND } ME_2) \text{ OR } ((ME_1 \text{ OR } ME_2) \text{ AND } (NME_3 \text{ OR } NME_4))$$

An inherent condition of the foregoing rule/policy is that non-managerial employees alone are not authorized to access and use the computer center's resources.

By way of further example, three applications $\{A_1, A_2, A_3\}$ resident on an integrated circuit card, e.g., a smart card, may be subject to a prescribed security rule/policy that states that only $A_1$ and $A_2$ in combination, or $A_1$ and $A_3$ in combination, can be used for transactions. This rule/policy is formulated as a Boolean Expression as follows:

$$(A1 \text{ AND } A2) \text{ OR } (A1 \text{ AND } A3)$$

Conditions inherent in the foregoing rule are that A2 and A3 cannot be used in combination for transactions, nor can A1, A2, or A3 be used for transactions singly (or for that matter in combination with any other applications resident on the integrated circuit card).

Prior to any group being authorized to perform an operation in accordance with a prescribed rule/policy, the entity or entities comprising any group established in accordance with the prescribed rule/policy must be individually authenticated to confirm the identity of such entity or entities. To do otherwise would render the prescribed rule/policy a non sequitur. Group authentication, therefore, entails authenticating individual entities using a public key cryptographic system to confirm the identity of such individual entities, determining whether authenticated individual entities alone or in combination comprise a group or groups defined by a prescribed rule/policy, and authorizing any authenticated group satisfying the rule/policy to perform or implement the operation governed by the prescribed rule or policy. Thus, a Group Authentication protocol not only involves "authentication", but concomitantly "authorizes" the implementation of a specific operation in the context of a prescribed rule/policy.

As disclosed above, it is known in the art to authenticate individual entities using a cryptographic system such as RSA. In accordance with such use, a verification entity would issue a random challenge as cleartext to such individual entities. Each individual entity would encrypt the random challenge as ciphertext using the individual entity's private key and provide such ciphertext to the verification entity. The verification entity would decrypt the ciphertext response of the individual entities using the corresponding public keys, thereby individually authenticating such entities. The verification entity would then correlate such authenticated entities against a prescribed rule or policy document, e.g., a look-up table, that establishes the one or more groups that are authorized to perform a specific operation in accordance with the prescribed rule/policy to determine whether the authenticated entities as a group comprise such an established group or groups, and, if so, authorizes such group or groups to perform the operation. This approach is disadvantageous inasmuch as the individual identities of the entities comprising the one or more groups are revealed to the verification entity such that a record exists of the specific entities comprising the one or more groups that are authorized to perform a specific operation. Further, the verification entity is in possession of the prescribed rule/policy document, which increases the likelihood that prescribed rule/policy will be compromised since the verification entity is presumed not to be a trusted entity. In addition, this scenario requires public-private key pairs for each entity, which significantly increases the computational workload and storage requirements imposed on the cryptographic system.

It is also known in the art to split a private key among the entities comprising one or more groups established in accordance with a prescribed rule/policy statement that is authorized to perform the specific operation governed by such prescribed rule/policy statement. The entities comprising such groups reconstruct the private key during the authentication process and the reconstructed private key is used by the verification entity to authorize entities comprising any authenticated group satisfying the rule/policy to perform an operation governed by the prescribed rule/policy statement. While this private key splitting technique is advantageous in that entities comprising any particular group are never individually identified during the authentication process, this technique is disadvantageous in that the private key is reconstructed during the authentication process such that the reconstructed private key is subject to compromise. As a general rule, any verification entity should be considered a non-trusted party in the context of an authentication process. Therefore, another disadvantage to the private key splitting technique is that the verification entity has access to the reconstructed private key during the authentication process, which increases the possibility that the reconstructed private key will be compromised.

A need exists to provide methods and systems for group authentication using public key cryptography in conjunction with a prescribed rule/policy statement that authorizes implementation or performance of an operation governed by the prescribed rule/policy by any authenticated group without identifying any entity comprising any such authenticated group, without revealing prescribed rules and policy statements, and without exposing private key material.

BRIEF SUMMARY OF THE INVENTION

One aspect of the present invention is to provide methods and systems for group authentication for multi-entity computer systems, particularly those having limited computational capabilities, that uses a cryptosystem such as the Naccache-Stern (NS) cryptosystem in conjunction with a prescribed rule or policy statement formulated as a Boolean Expression such that no member of any group encompassed by the rule/policy statement is identified during the Group Authentication protocol.

Another aspect of the present invention is to provide methods and systems for group authentication for multi-entity computer systems, particularly those having limited computational capabilities, that uses a cryptosystem such as the NS cryptosystem in conjunction with a prescribed rule/policy statement formulated as a Boolean Expression such that no sensitive data such as the private key or share thereof or the rule/policy statement or its Boolean Expression is exposed or reconstructed during the Group Authentication protocol.

A further aspect of the present invention is to provide methods and systems for group authentication for multi-entity computer systems, particularly those having limited computational capabilities, that uses a cryptosystem such as the NS cryptosystem in conjunction with a prescribed rule/policy statement formulated as a Boolean Expression such that knowledge of which groups can be authenticated is not made known to the verifier during the Group Authentication protocol.

These and other aspects of the present invention are achieved by a method for group authentication using a public key cryptosystem that includes a public key and a private key, comprising the steps of providing a Private Key Share to a Tool of each Entity of each Group encompassed by a Boolean Expression of a prescribed Rule based upon the private key, encrypting a random number using the public key of the public key cryptosystem to generate a ciphertext challenge at a Verification Device, conveying the ciphertext challenge to the Tool of each Entity in communication with the Verification Device, generating a response to the ciphertext challenge using the Private Key Share of the Tool of each Entity in communication with the Verification Device, transmitting the response generated by each Entity in communication with the Verification Device to the Verification Device, combining the responses received from the Entities in communication with the Verification Device, determining whether any combination of the responses equals the random number wherein any combination that equals the random number identifies an Authenticated Group and any combination that does not equal the random number identifies a non-authenticated Group, and effecting an apposite course of action with respect to an Operation governed by the prescribed Rule based upon the outcome of the determining step.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1A is an exemplary embodiment of an Entity Tool for the group authentication system of FIG. 1.

FIG. 1B is an exemplary embodiment of a Verification Device for the group authentication system of FIG. 1.

FIG. 3A is an exemplary embodiment of an Entity Tool for the group authentication system of FIG. 3.

DETAILED DESCRIPTION OF THE INVENTION

Figure 1:
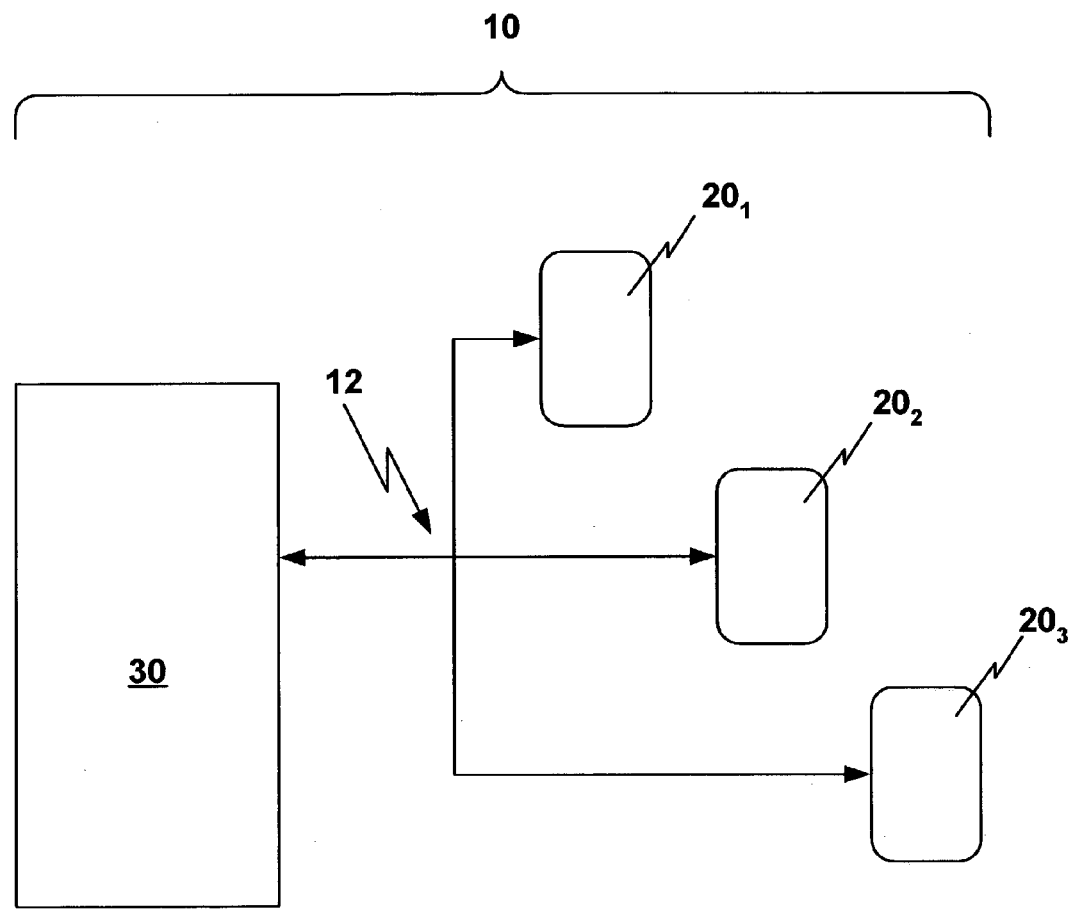
FIG. 1 illustrates one embodiment of a group authentication system according to the present invention.
Figure 1:
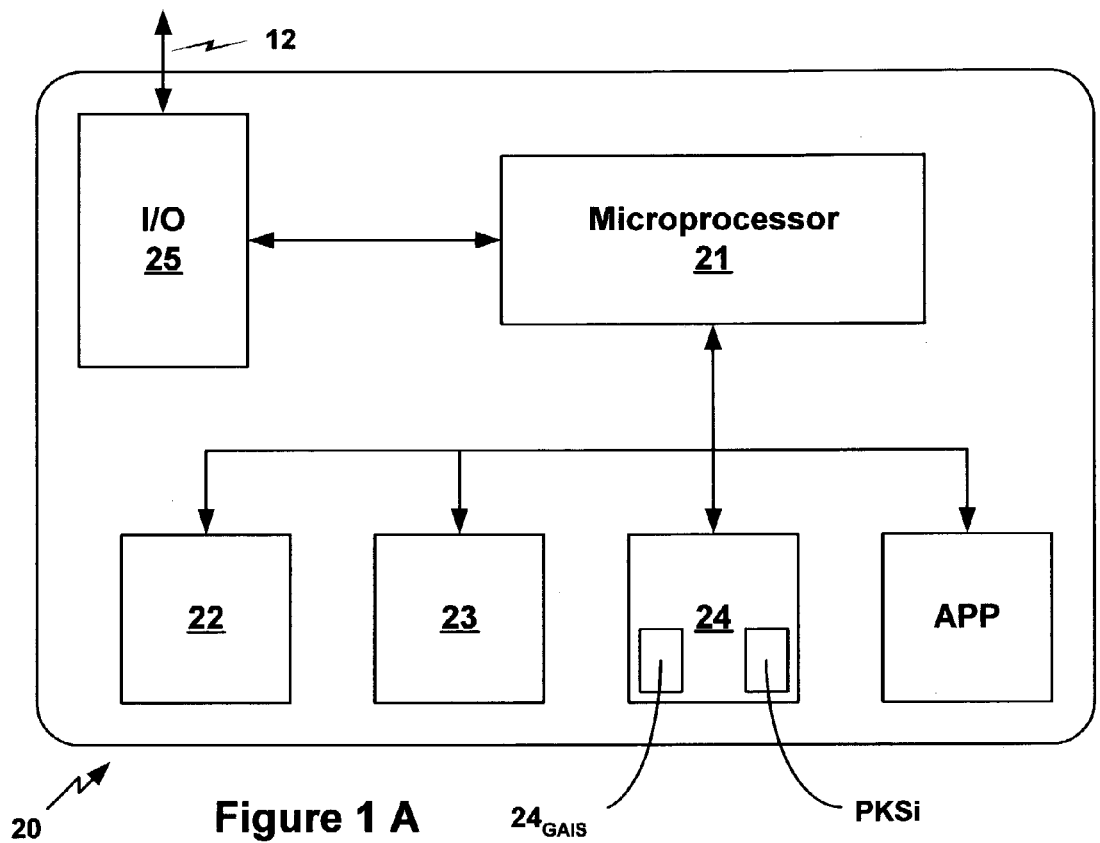
Figure 1:
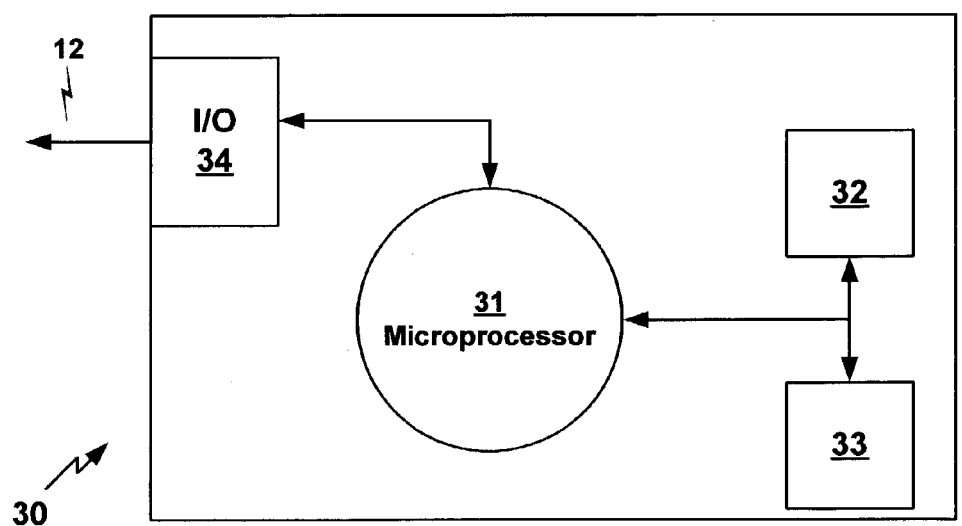

The invention described in the following paragraphs encompasses methods and systems for group authentication using public key cryptography, and preferably, the Naccache-Stern (NS) cryptosystem, in conjunction with a prescribed rule or policy statement formulated as a Boolean Expression that authorizes any group and/or groups successfully authenticated during the Group Authentication protocol to implement or perform the operation governed by the prescribed rule/policy statement. That is, the group authentication methods and systems according to the present invention provides for the authentication of one or more groups per se (without the authentication of individuals comprising such groups) in conjunction with compliance with the prescribed rule/policy statement governing the authorization of any authenticated group as a unit to implement or perform an operation.

The group authentication methods and systems according to the present invention do not result in the divulgation of the identity of any individual entity comprising any authenticated group (or for that matter, any non-authenticated group), do not require the divulgation or reconstruction of sensitive data such as the private key or the prescribed rule/policy statement or its Boolean Expression, and do not divulge any information regarding which groups can be authenticated during the Group Authentication protocol.

The group authentication methods and systems according to the present invention have utility in any circumstance wherein a rule/policy statement prescribes conditions precedent to the implementation or performance of a specific operation or access to a protected resource wherein one of the conditions precedent involves the authentication of one or more entities comprising one or more groups, particularly in the context of multi-entity transaction systems such as integrated cards, e.g., smart cards, wherein a rule/policy statement controls which applications residing on the card can co-operate or interact with which other application(s) residing on the card in creating, conducting or performing transactions. The present invention has particular utility in multi-entity computer systems with limited computational capabilities such as multi-application integrated circuit cards, e.g., smart cards.

The group authentication methods and systems according to the present invention are disclosed herein in terms of the following terminology, which is used to facilitate a more concise understanding of the present invention:

"Entity"=person or thing that has a separate and distinct existence and an objective or conceptual reality and is capable of being uniquely identified, e.g., a person, an organization, an application program, a computer system.

"Operation"=a specified function, action, task, transaction, process, procedure, etc. and/or access to protected resources, that is authorized for implementation or performance by any Group that has been authenticated.

"Rule"=any prerequisite(s) or condition(s) precedent prescribed by competent authority in connection with an Operation that must be satisfied before the implementation or performance of the Operation by any Group. As used herein, the terminology "policy statement" is synonymous with "Rule".

"Group"=a set or collection of one or more Entities.

"Boolean Expression"=a well-formed symbolic representation consisting of variable terms each representing an Entity together with the logical combining operations AND, OR, and/or NOT which when the Boolean Expression evaluates to TRUE defines one of the Groups defined by a prescribed Rule.

"Group Authentication"=a process, procedure, or protocol for determining whether any Group comprising one or more Entities is one of the Groups defined by the Boolean Expression.

"Authenticated Group"=a determination that a Group comprising one or more Entities has been established to be one of the Groups defined by the Boolean Expression using Group Authentication.

"Verification Entity"=the competent authority or the representative thereof that monitors and manages the group authentication protocol according to the present invention.

"Private Key Share" ($PKSi$)=that portion of the private key of a public key cryptosystem such as the NS cryptosystem allocated to and possessed by an Entity. As used herein, the terminology Private Key Share can encompass the private key in toto, i.e., the portion of the private key possessed by an Entity equals the private key.

"Tool"=the means utilized by an Entity to store the Private Key Share and to implement the Group Authentication protocol. For the embodiments described herein, the Tool is exemplified by an integrated circuit card ("smart card") that includes a set of instructions for implementing the Group Authentication protocol using a Private Key Share.

"Verification Device"=the means utilized to store the public key of a public key cryptosystem such as the NS cryptosystem corresponding to the private key and to faithfully implement the Group Authentication protocol. For the embodiments described herein, the Verification Device is exemplified by a integrated circuit card reader that includes an instruction set, i.e., application, for implementing the Group Authentication protocol using the associated public key. In many contexts, the Verification Device is synonymous with the Verification Entity, i.e., where the Verification Device can autonomously authorize or prohibit implementation or performance of the Operation without human intervention.

Rules are established to govern or regulate Operations for a variety of reasons such as efficient utilization of resources, preventing misuse or misappropriation of resources, codification of established practices, relationships, or legal agreements, ensuring the security and integrity of confidential information, safety concerns, compliance with statute or regulatory authority, etc. For example, a Rule may be established by senior management (the competent authority) to govern or regulate the use of a corporate aircraft, i.e., the Operation, by corporate employees (trade offs between the costs of flying commercial, costs to operate the corporate aircraft, and time-savings benefits to the corporation). Or, a Rule may be established by the Board of Trustees (the competent authority) to govern or regulate access to and use of a university computer center's resources, i.e., the Operation, by faculty, students, and third parties (security of confidential information, compliance with copyright laws, preventing misuse or misappropriation of resources stored in or accessible through such computer resources). Or, a Rule may be established by a smart card issuer (the competent authority) to define or specify which application programs on the smart card can interact to perform smart card transactions, i.e., the Operation while concomitantly providing for security of confidential information and codification of business relationships and/or contractual arrangements.

Such Rules prescribe the authorized behavior of Groups in the context of the associated Operations. To ensure compliance or conformance with such Rules such Groups defined by the Rules, a Group Authentication protocol is implemented to verify that a collection or set of Entities is an authorized Group defined by such prescribed Rules. Successful authentication authorizes a successfully Authenticated Group to implement or perform the Operations governed by such prescribed Rules.

Group Authentication Using Private Key Shares:

Conceptually, the implementation of the described embodiments of group authentication methods and systems according to the present invention involves two phases: (1) the personalization phase; and (2) the authentication phase, i.e., the Group Authentication protocol or method. In the personalization phase, the Tools for the Entities comprising the Groups defined by a prescribed Rule and the Verification Device (of the Verification Entity) are configured for implementation of the authentication phase. This entails:

(i) formulating a prescribed Rule as a Boolean Expression;

(ii) creation of a public and private key pair using a public key cryptosystem such as the NS cryptosystem;

(iii) splitting the private key among the Entities comprising the Groups defined by the prescribed Rule as required in accordance with the Boolean Expression thereof, i.e., generation of the Private Key Share PKSi possessed by each Entity of each Group defined by the Boolean Expression of the prescribed Rule (in the case of non-monotone access conditions discussed below, the Private Key Share PKSi consists of an ordered sequence of values);

(iv) distributing the Private Key Share PKSi to the Tool of each Entity of the Groups defined by the Boolean Expression of the prescribed Rule; and (v) distributing to the Verification Device the public key associated with the private key.

The authentication phase or Group Authentication protocol comprises an orderly series of steps taken between the Entities comprising the Group(s) and the Verification Device/Verification Entity for the purpose of authenticating such Group(s) wherein such steps comprise a challenge-response procedure. These steps include:

(i) generating and providing a random number M for the Verification Device;

(ii) operating the Verification Device to encrypt the random number M with the associated public key, e.g., NS cryptosystem public key, to form a ciphertext challenge C;

(iii) transmitting the ciphertext challenge C to each Entity in communication with the Verification Device;

(iv) generating a response $M_i$ (where subscript i identifies the response of any particular Entity) for each Entity in communication with the Verification Device (in the case of non-monotonic access conditions discussed below $M_i$ consists of an ordered sequence of values, one for each value in the ordered sequence of values of the corresponding PKSi). For a first embodiment of a Group Authentication method and system according to the present invention this encompasses:

(a1) decrypting of the ciphertext challenge C by each Entity in communication with the Verification Device using such Entity's Private Key Share(s) PKSi to directly generate the response $M_i$ for each such Entity.

For a second embodiment of a Group Authentication method and system according to the present invention this encompasses:

(a2) decrypting of the ciphertext challenge C by each Entity in communication with the Verification Device using such Entity's Private Key Share PKSi to generate a response M, and then filtering such response M to provide the response $M_i$ indirectly for each such Entity.

(v) transmitting the response $M_i$ of each such Entity to the Verification Device using the communications link 12 between the Entities and the Verification Device;

(vi) combining the responses $M_i$ in accordance with the Group Authentication protocol;

(vii) determining whether any combination of responses $M_i$ define a Group that is authorized to implement or perform the Operation in accordance with the prescribed Rule, i.e., do any combinations of responses $M_i$ equal the random number M; and (viii) effecting the appropriate course of action based upon the outcome(s) of the determination step, which will be:

(a) authorizing an Authenticated Group to implement or perform the Operation; and/or (b) preventing a non-authenticated Group from implementing or performing the Operation.

To facilitate a better understanding of the group authentication systems and methods according to the present invention, the first embodiment of the methods and systems for Group Authentication is described herein in terms of a simple example wherein a limited set of Entities $\{A_1, A_2, A_3\}$, e.g., individuals or applications resident on a integrated circuit card, is subject to a prescribed Rule that establishes the conditions precedent wherein Groups of Entities are authorized to implement or perform a specific Operation. For the purposes of the present example, the Rule prescribes that only two Groups of Entities, i.e., the Entities $A_1$ and $A_2$, which in combination comprise Group $G_1$, and/or the Entities $A_1$ and $A_3$, which in combination comprise Group $G_2$, are authorized to perform the Operation. Implicit in this Rule is the restriction that no single Entity in the set $\{A_1, A_2, A_3\}$ is authorized to perform the operation nor is the combination consisting solely of Entities $A_2$ and $A_3$, comprising Group $G_3$, authorized to perform the Operation. This prescribed Rule is formulated as a Boolean Expression as follows:

$$(A_1 \text{ AND } A_2) \text{ OR } (A_1 \text{ AND } A_3).$$

This example illustrates the following characteristics of Group Authentication according to the present invention:

(a) the prescribed Rule formulated as a Boolean Expression authorizes either or both of the Groups ($G_1$, $G_2$), via the Entities comprising such Groups, to conduct or perform the Operation governed by the prescribed Rule by virtue of the fact that the Boolean Expression evaluates to TRUE if and only if the Entities comprising either of the Groups $G_1$, $G_2$ are participating in the Group Authentication protocol.

(b) the prescribed Rule formulated as a Boolean Expression prohibits the combination of the Entities $A_2$, $A_3$ from conducting the Operation governed by the prescribed Rule, i.e., the combination of Entities $A_2$, $A_3$ implicitly define the Group $G_3$ that is not authorized by the prescribed Rule by virtue of the fact that the Boolean Expression evaluates to FALSE when only Entities $A_2$ and $A_3$ (and no others) are participating in the Group Authentication protocol.

(c) the prescribed Rule formulated as a Boolean Expression prohibits any single Entity $A_i$ of the set $\{A_1, A_2, A_3\}$ from conducting the Operation governed by the prescribed Rule by virtue of the fact that the Boolean Expression evaluates to FALSE when only one of these Entities (and no others) is participating in the Group Authentication protocol.

The group authentication methods and systems according to the present invention utilizes the NS cryptosystem to generate a NS cryptosystem public key $\{v_i\}$ and a Private Key Share PKSi that is allocated each Entity $A_i$ in accordance with the prescribed Rule. A ciphertext challenge C, based upon a random number M, is computed using the public key $\{v_i\}$ as follows:

$$C = v_i^{xi} \bmod p \qquad \text{eq. (1)}$$

where the xi are the digits of the base 2 expansion of M, i.e., $M = \Sigma\, 2^{xi}$.

The decryption function of the NS cryptosystem (P, p, s) for a ciphertext challenge C encrypted using the NS cryptosystem public key is a response M defined by:

$$M = \Sigma\{2^i | p_i \text{ is a factor of } C^s \bmod p\} \qquad \text{eq. (2)}$$

where $P = \{p_i\}$ is a set of prime numbers, p is a prime number greater than $\Pi\, p_i$, C is the ciphertext challenge created by the Verification Device from the random number M according to eq. (1), s is the NS cryptosystem private key, and M is the plaintext or decrypted representation of the ciphertext challenge C.

Let $A = \{A_i\}$ be the set of Entities $\{A_1, A_2, A_3\}$ described above and let the Boolean Expression use only the AND and OR logical operators over A, e.g.:

$$(A_1 \text{ AND } A_2) \text{ OR } (A_1 \text{ AND } A_3) \qquad \text{eq. (3)}$$

The algorithm described by Benaloh and Leichter (see Benaloh, Josh and Leichter, Jerry, "Generalized Secret Sharing and Monotone Functions", *Advances in Cryptology*: Proceedings of CRYPTO '88, August 1988 ed. by S. Goldwasser; Lecture Notes in Computer Science, V. 403; pp. 27–35, G. Goos and J. Hartmanis edition, Springer-Verlag, NY 1990) is applied to associate a particular subset $P_i$ of P with each Entity $A_i$ according to the Boolean Expression of eq. (3). The collection $\{P_i\}$ of subsets of P generated by the Benaloh-Leichter algorithm has the property that the union of the sets in any subcollection of the collection $\{P_i\}$ is equal to P if and only if the $A_i$ associated with the sets in the subcollection make the Boolean Expression TRUE. This property is what is meant by constructing the $P_i$ according to the Boolean Expression.

Thus, in the immediately preceding example, the Benaloh-Leichter algorithm creates subsets $P_1$, $P_2$, and $P_3$ of P for Entities $A_1$, $A_2$, and $A_3$, respectively, such that $P_1 \cup P_2 = P$ and $P_1 \cup P_3 = P$, but $P_2 \cup P_3 \neq P$. By way of a pragmatic illustration of these concepts, if $P = \{3, 5, 7, 11\}$, then taking $P_1 = \{3, 5, 7\}$ and $P_2 = P_3 = \{11\}$ satisfies the condition.

The 2-tuple $(P_i, s)$ is the Entity $A_i$'s allocated share of the NS cryptosystem private key, i.e., Private Key Share $PKS_i$. That is, for the Entities $\{A_1, A_2, A_3\}$ subject to the Boolean Expression set forth in eq. (3) above, Entity $A_1$ possesses $(P_1, s) = PKS_1$, Entity $A_2$ possesses $(P_2, s) = PKS_2$, and Entity $A_3$ possesses $(P_3, s) = PKS_3$.

Each Entity $A_i$'s contribution $M_i$ to the decryption of the ciphertext challenge C is given by $$M_i = \Sigma\{2^i | p_j \in P_i \text{ and } p_j \text{ is a factor of } C^s \bmod p\} \qquad \text{eq. (4)}$$

and the plaintext response M is given by $M = \vee M_i$ where $\vee$ denotes the bitwise logical OR of the base 2 expansions of $M_i$.

Referring now to the drawings wherein like reference numerals identify corresponding or similar elements throughout the several views, FIGS. 1, 1A, and 1B illustrate one embodiment of a group authentication system 10 according to the present invention. The group authentication system 10 comprises a Tool 20 (see FIG. 1A) for each Entity $A_i$ encompassed by the Rule, and a Verification Device 30 (see FIG. 1B) operating as or on behalf of the Verification Entity. Each Tool 20 is linked to the Verification Device 30 by means of a communication link 12 for each Entity in communication with the Verification Device 30. For the embodiment described herein in terms of the exemplary Rule set forth above as eq. (3), each Entity $A_1$, $A_2$, $A_3$ possesses a corresponding Tool $20_1$, $20_2$, $20_3$, respectively, as exemplarily illustrated in FIG. 1.

The Tools $20_1$, $20_2$, $20_3$ depicted in FIG. 1 are illustrated generically in greater detail in FIG. 1A as Tool 20, which for the described embodiment is represented as an integrated circuit or smart card, that comprises a microprocessor 21, a first memory module 22, a second memory module 23, a non-volatile memory module 24, and an I/O interface 25. One skilled in the art will appreciate that the Tool 20 for the group authentication system 10 of the present invention is not limited to an integrated circuit or smart card, but can include any means, e.g., a computer system or security token, that is capable of storing the allocated Private Key Shares PKSi for each Entity of any Group prescribed by a Rule and implementing the functionality described below.

The microprocessor 21 is any suitable central processing unit that is capable of executing stored instruction sets to implement and manage the functions of the Tool 20 including, but not necessarily limited to:

(1) communicating with the Verification Device 30.

(2) executing the Group Authentication protocol.

(3) generating a response $M_i$ for each Entity of any Group defined by the Group Authentication protocol in communication with the Verification Device 30. For this embodiment, this generating function is accomplished by decrypting the encrypted random challenge, i.e., the ciphertext challenge C, transmitted by the Verification Device 30 using the NS cryptosystem Private Key Share PKSi stored in the Tool 20 of such particular Entity to directly generate the response $M_i$ (see disclosure below directed to an alternative embodiment that indirectly generates the response $M_i$).

(4) transmitting the responses $M_i$ to the Verification Device 30 using the communication link 12.

The first memory module 22, e.g., RAM, provides storage for calculated results, e.g., the decrypted challenge, and also functions as stack memory for the Tool 20. The second memory module 23, e.g., ROM, stores the operating system of the Tool 20, fixed data, and any standard instruction sets implemented by the Tool 20. The I/O interface 25 provides the interconnection mechanism (see arrow 12 in FIGS. 1, 1A, 1B) between the Tool 20 and the Verification Device 30 for communication therebetween, e.g., physical contacts, radiant energy (wireless). The Tool 20 can also include additional stored items APP, e.g., application program(s) for conducting or performing the Operation and/or application(s) for conducting transactions or implementing functions not associated with the Operation.

The non-volatile memory module 24, e.g., flash memory (flash RAM), EEPROM, or FRAM (ferroelectric RAM) provides persistent storage for information that must not be lost when the Tool 20 is disconnected from the Verification Device 30 of the Verification Entity while concomitantly allowing the alteration of some or all of such stored information and/or the addition of new information under specified conditions. For the described embodiment, the NS cryptosystem Private Key Share PKSi of any particular Entity $A_i$ of the set A is stored in the non-volatile memory 24 of the Tool 20 possessed by such particular Entity $A_i$ and an instruction set $24_{GAIS}$ used by the microprocessor 21 to implement the functions of the Tool 20 described above is also stored in non-volatile memory 24. One skilled in the art will appreciate that the group authentication functionality of the Tool 20 could also be implemented as hardware and/or firmware or combinations thereof rather than as instruction sets/software.

This configuration of the Tool 20 allows the Private Key Share PKSi of any particular Entity $A_i$ and/or the group authentication instruction set $24_{GAIS}$ to be readily changed (added to, deleted, or modified) as a result of a change in the Rule (and its formulation as a Boolean Expression). One skilled in the art will appreciate that the allocated Private Key Share PKSi and the group authentication instruction set $24_{GAIS}$ could also be stored in the second memory module 23, although this permutation may require the replacement of the second memory module 23 for a Rule change.

The Verification Device 30 illustrated in FIG. 1C, which for the described embodiment is represented as an integrated circuit card reader, includes a microprocessor 31, a memory module 32, an application module 33, and an I/O interface 34. One skilled in the art will appreciate that the Verification Device 30 for the group authentication system 10 of the present invention is not limited to an integrated circuit card reader, but can include any means, e.g., a computer system, that is capable of storing the NS cryptosystem public key and implementing the functions described below as or on behalf of the Verification Entity.

The microprocessor 31 is any suitable central processing unit that is capable of executing stored instruction sets to implement and manage the functions of the Verification Device 30 including, but not necessarily limited to:

(1) communicating with the Tool $20_i$ of each Entity $A_i$ initiating the Group Authentication protocol by placing the Tool $20_i$ in communication with the Verification Device 30.

(2) executing the Group Authentication protocol.

(3) generating a random number M.

(4) encrypting the random number M using the NS cryptosystem public key stored in the Verification Device 30 to form the ciphertext challenge C.

(5) transmitting the ciphertext challenge C to the Tool $20_i$ of each Entity $A_i$ in communication with the Verification Device 30.

(6) combining the responses $M_i$ received from the Tools $20_i$ of Entities $A_i$ in communication with the Verification Device 30 using the logical OR operation $\vee$.

(7) determining whether the combination of the responses $M_i$ from the Entities $A_i$ in communication with the Verification Device equals the random number M generated by function (3).

(8) effecting the appropriate course of action based upon the outcome(s) of the determination function by either (a) authorizing an Authenticated Group to conduct or perform the Operation, i.e., the combination of the responses $M_i$ from the Tool(s) of the Entity/Entities comprising the Group equals M; or (b) preventing a non-authenticated Group from conducting or performing the Operation, i.e., the combination of the responses $M_i$ from the Tool(s) of the Entity/Entities comprising the Group does not equal M.

The memory module 32 provides storage for calculated results, e.g., the response $M_i$ received from each corresponding Tool $20_i$ and the combinations thereof, and functions as stack memory for the Verification Device 30, stores the operating system of the Verification Device 30, fixed data, and any standard instruction sets implemented by the Verification Device 30 The application module 33 includes the group authentication instruction set used by the microprocessor 31 to implement the functionality of the Verification Device 30 described above as well as any other instruction sets used to implement and manage functions of the Verification Device 30 that are not associated with the Group Authentication protocol and functions (alternatively these group authentication instruction sets could be stored in the memory module 32 and/or implemented as hardware or firmware or combinations thereof). The I/O interface 34 provides the interconnection means that enables the communications link 12 between the Tool 20 and the Verification Device 30, e.g., physical contacts, radiant energy (wireless).

Figure 2:
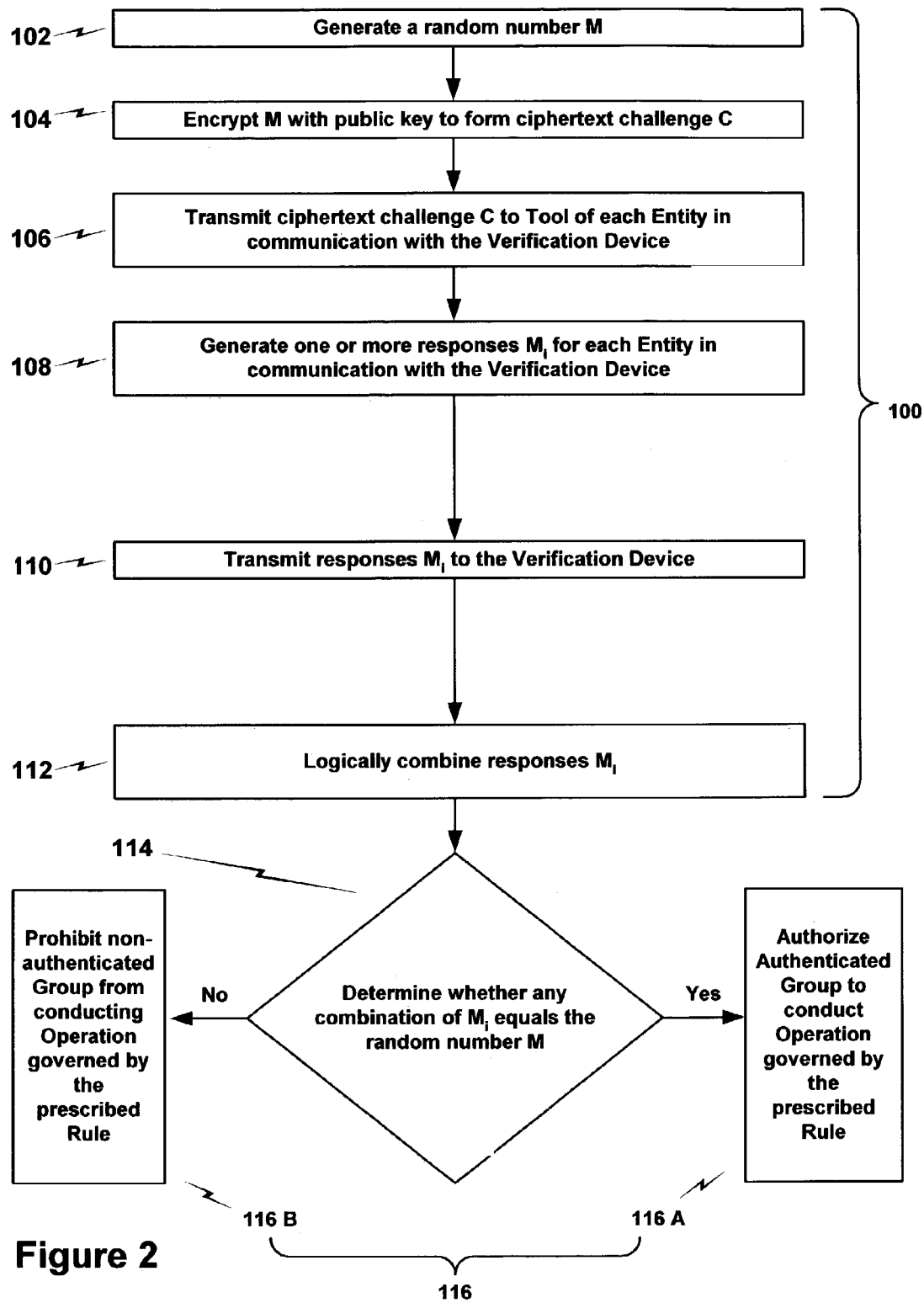
FIG. 2 depicts a Group Authentication protocol or method for the group authentication system of FIG. 1.

FIG. 2 illustrates the Group Authentication protocol or method 100 utilized by the group authentication system 10 described in the preceding paragraphs. This group authentication method 100 presupposes that the tasks described in the personalization phase have been accomplished prior to implementing the Group Authentication protocol or method 100, e.g., the NS cryptosystem private key has been split into Private Key Shares PKSi in accordance with the Boolean Expression of the prescribed Rule (see discussion below regarding non-monotone access conditions regarding the generation of Private Key Shares that comprise an ordered sequence of values), the Private Key Shares PKSi have been stored on the Tools $20_i$ of the Entities comprising the Groups encompassed by the Boolean Expression of the prescribed Rule, and that the NS cryptosystem public key has been stored in the Verification Device 30.

In a first step 102 the Verification Device 30 is operative to generate a random number M (using any of the means known in the art for generating random numbers). Next, in step 104, the Verification Device 30 is operative to encrypt the random number M using the NS cryptosystem public key to form the ciphertext challenge C. In a step 106, the Verification Device 30 is operative to transmit the ciphertext challenge C to all the Tools 20*i* of the Entities $A_i$ in communication with the Verification Device 30.

In step 108, Entities $A_1, A_2, A_3$ in communication with the Verification Device 30 decrypt the ciphertext challenge C using the NS cryptosystem Private Key Share $PKS_1, PKS_2, PKS_3$ (where PKSi indicates a single value or an ordered sequence of values for each Entity $A_i$) in the corresponding Tool $20_1, 20_2, 20_3$, respectively, to directly generate responses $M_1, M_2, M_3$ (where Mi indicates a single response or an ordered sequence of responses for each Entity $A_i$), respectively. Each such Entity $A_1, A_2, A_3$ transmits (via the respective Tool $20_1, 20_2, 20_3$) its respective responses $M_1, M_2, M_3$ to the Verification Device 30 in step 110.

The Verification Device 30 is operative in step 112 to combine the responses $M_1, M_2, M_3$. Next, in step 114 the Verification Device 30 is operative to determine if the combination of the responses $M_1, M_2, M_3$ from the Entities $A_1, A_2, A_3$ equals the random number M.

In step 116, the Verification Device 30 is operative to effect the apposite course of action based upon the outcome(s) of step 114. If the combined response(s) $M_i$ equals the random number M, the Verification Device 30 is operative in step 116A to authorize the Authenticated Group to conduct or perform the Operation governed by the prescribed Rule. For the described embodiment, Entities $A_1$, $A_2$ comprising Group $G_1$ and/or Entities $A_1$, $A_3$ comprising Group $G_2$. If the combination of response(s) from a Group does not equal the random number M, the Verification Device is operative in step 116B to bar the non-authenticated Group from conducting or performing the Operation governed by the prescribed Rule. For the described embodiment, the Group $G_3$ (comprising the Entities $A_2$, $A_3$ in combination) or Groups consisting of the singular Entities A1, A2, A3, respectively).

To further illustrate the group authentication system 10 and method 100 described above in terms of the set of Entities {A1, A2, A3} subject to the prescribed Rule expressed as the Boolean Expression set forth eq. (3) above, let the NS cryptosystem (P, p, s) be given by p=211, P={2, 3, 5, 7}, and s=17 where P is the set consisting of the first four prime numbers, p is the next prime number greater than $\Pi\ p_i$ where $\Pi\ p_i = 2 \times 3 \times 5 \times 7 = 210$, and $s = \Sigma\ p_i = 2+3+5+7 = 17$. The public key {$v_i$} for this NS cryptosystem is {162, 72, 76, 207}. If the number eleven (base 2: 1011) is generated as the random number M in step 102, then the ciphertext challenge C computed using the public key {$v_i$} and transmitted to each Tool $20_1$, $20_2$, $20_3$ in steps 104 and 106 is $$C = \Pi v_i^{xi} \bmod p = 207^1 * 76^0 * 72^1 * 162^1 \bmod 211 = 241448 \bmod 211 = 186 \quad \text{(eq. 4)}$$

where $M = \Sigma\ 2^{xi}$. The NS cryptosystem private key s has been split among the Entities $A_1$, $A_2$, $A_3$ as follows:

$$P_1 = \{2,3\} \text{ and } P_2 = P_3 = \{5,7\}$$

Then $M_1 = \Sigma\{2^i | p_i \in \{p_0 = 2, p_1 = 3\}$ and $p_i$ is a factor of $42\} = 2^0 \vee 2^1 = 001 \vee 010 = 0011$ (base 2) is the response $M_1$ generated by Entity $A_1$ in step 108 and $M_2 = M_3 = \Sigma\{2^i | p_i \in \{p_2 = 5, p_3 = 7\}$ and $p_i$ is a factor of $42\} = 2^3 = 1000$ (base 2) is the response $M_2$ and/or $M_3$ generated by Entity $A_2$ and/or Entity $A_3$, respectively, in step 108.

As noted above, in step 112 the responses $M_1$, $M_2$, $M_3$ are combined. Combining response $M_1$ with either response $M_2$ and/or response $M_3$ results in compliance with the Boolean Expression of the prescribed Rule, i.e., $M_1 \vee M_2$ or $M_1 \vee M_3$ is $0110 \vee 1000$, which equals 1110, which equals the random number M (where M=11) generated in step 102.

Group Authentication Using Filtering:

An alternative embodiment of the group authentication system 10 described above is exemplarily illustrated in FIG. 3 wherein such alternative embodiment is identified by reference numeral 10'. This embodiment of the group authentication system 10' is described herein in terms of another simple example wherein a limited set of Entities {$A_1$, $A_2$, $A_3$}, e.g., individuals or applications resident on a integrated circuit card, is subject to a prescribed Rule that establishes the conditions precedent wherein Groups of Entities are authorized to implement or perform a specific Operation. For the purposes of the present example, the Rule prescribes that only two Groups of Entities, i.e., the Entity $A_1$, which comprises Group $G_1$, and/or the Entities $A_2$, $A_3$, which in combination comprise Group $G_2$, are authorized to perform the Operation. Implicit in this Rule is that the single Entities $A_2$, $A_3$ are not authorized to perform the Operation. This prescribed Rule is formulated as a Boolean Expression as:

$$(A_1) \text{ OR } (A_2 \text{ AND } A_3) \quad \text{eq. (5)}$$

This example illustrates the following characteristics of group authentication according to the present invention:

(a) the prescribed Rule formulated as a Boolean Expression authorizes a single Entity, e.g., Entity $A_1$, which comprises the Group $G_1$, to conduct or perform the Operation governed by the prescribed Rule.

(b) the prescribed Rule formulated as a Boolean Expression authorizes the Group $G_2$, comprised of the combination of two Entities $A_2$, $A_3$, to conduct or perform the Operation governed by the prescribed Rule.

(c) the prescribed Rule formulated as a Boolean Expression implicitly prohibits any single Entity $A_i$ of the set {$A_2$, $A_3$} from conducting the Operation governed by the prescribed Rule.

This alternative group authentication system 10 comprises a Tool 20 (see FIG. 3A) for each Entity $A_i$ of each Group Gk encompassed by the prescribed Rule and the Terminal Device 30, which embodies the same elements and provides the same functionality as the Terminal Device 30 described above and illustrated in FIG. 1B. For the embodiment described herein in terms of the exemplary Rule set forth above as eq. (5), each Entity $A_1$, $A_2$, $A_3$ possesses a corresponding Tool $20_1'$, $20_2'$, $20_3'$, respectively, as exemplarily illustrated in FIG. 3 and described in further detail in the following paragraphs.

Figure 3:
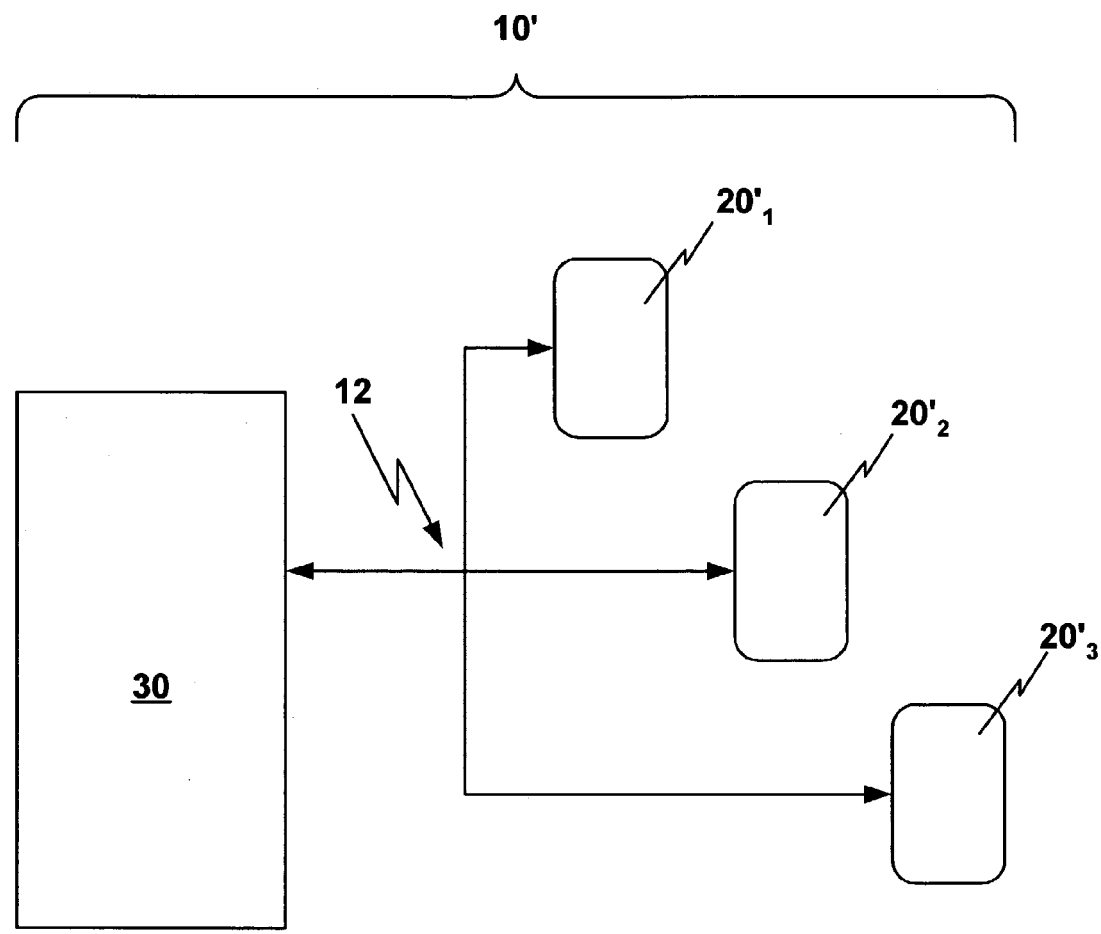
FIG. 3 illustrates another embodiment of a group authentication system according to the present invention.
Figure 3:
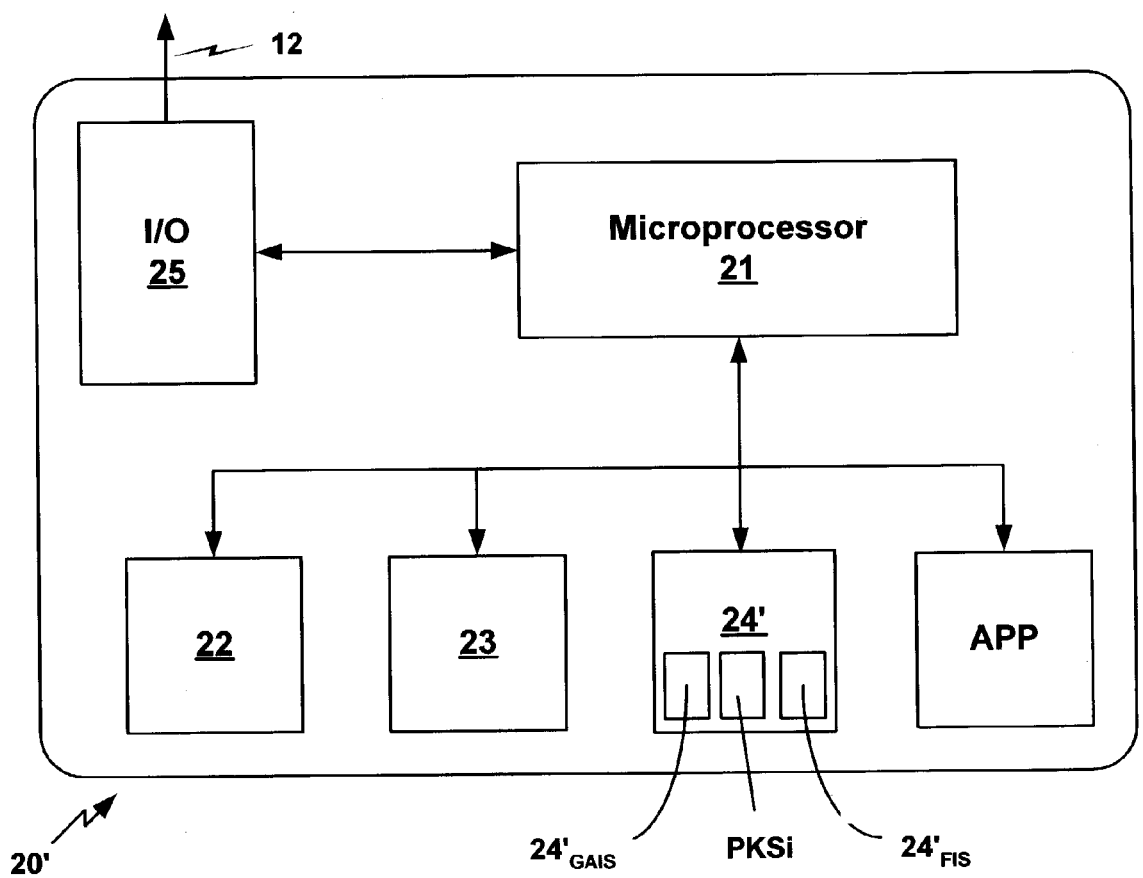

The Tools $20_1'$, $20_2'$, $20_3'$ depicted in FIG. 3 are illustrated generically in greater detail in FIG. 3A as Tool 20'. The Tool 20' includes the same elements and provides the same functionality as the Tool 20 described above for the group authentication system 10 with the following exceptions. For this embodiment, there is no splitting of the private key among the Entities $A_i$ comprising the Groups $G_k$ identified by the Boolean Expression of the prescribed Rule. Rather, each Entity $A_1$, $A_2$, $A_3$ possesses the entire private key, i.e., the Private Key Share PKSi for each Entity $A_1$, $A_2$, $A_3$ equals the private key in toto, e.g., $PKS_1 = PKS_2 = PKS_3 = $ private key, which is stored in the in non-volatile memory module 24' of the respective Tools $20_1'$, $20_2'$, $20_3'$.

Without further modification, however, each Entity $A_i$ would generate the response M upon decrypting the ciphertext challenge M transmitted by the Verification Device 30. Such responses, however, would not necessarily be in compliance with the Boolean Expression of the prescribed Rule as set forth in eq. (5) above, i.e., eq. (5) does not authorize either Entity $A_2$ or $A_3$ individually to conduct or perform the Operation, but only in the logical combination $A_2$ and $A_3$.

Therefore, to secure compliance with the Boolean Expression of the prescribed Rule, each Tool $20_1'$, $20_2'$, $20_3'$ further includes a filtering instruction subset 24', which is stored in the non-volatile memory module 24' as part of the group authentication instruction set $24_{GAIS}'$ (illustrated in FIG. 3A as separate objects), that is based upon the Boolean Expression of the prescribed Rule. Execution of the filtering instruction subset $24_{FIS}'$ by the microprocessor 31 causes the response M generated by any such Entity $A_i$ to be filtered in accordance with the Boolean Expression of the prescribed Rule. That is, the filtering of the response M produces a filtered response $M_i$ for each Entity $A_i$ in accordance with the Boolean Expression of the prescribed Rule. While it is preferable that the filtering functionality of the Tool 20' be implemented as the instruction subset $24_{FIS}'$, one skilled in the art will appreciate that the filtering functionality could also be implemented as hardware or firmware, or combinations thereof. Likewise, the instruction subset $24_{FIS}'$ could be stored in the second memory module 23, subject to the potential limitation described above.

Figure 4:
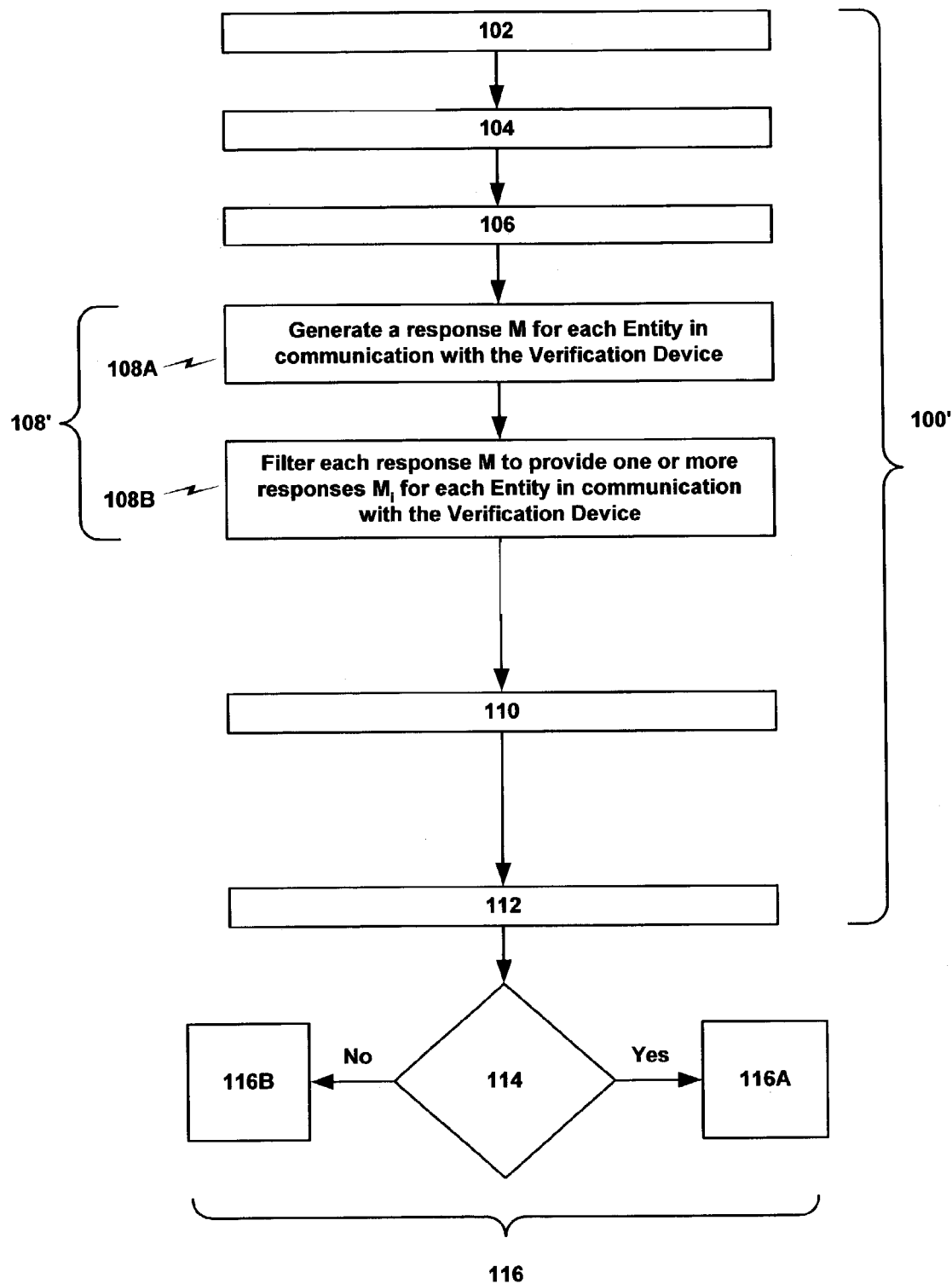
FIG. 4 depicts a Group Authentication protocol or method for the group authentication system of FIG. 3.

A Group Authentication protocol or method 100' for the group authentication system 10' is exemplarily illustrated in FIG. 4. The steps 102, 104, 106, 110, 112, 114, and 116 are equivalent to the corresponding steps in the group authentication method 100 described above. Step 108' of the group authentication method 100' reflects the two-stage process necessary to indirectly generate the response $M_i$ for each Entity $A_i$ in communication with the Verification Device 30 in reaction to a ciphertext challenge C message from the Verification Device 30.

In a first substep 108A, in response to a ciphertext challenge C from the Verification Device 30, the microprocessor 21 of each Tool 20$_i$ in communication with the Device 30 is operative to implement the group authentication instruction subset 24$_{GAIS}$' to decrypt the ciphertext challenge C using the Private Key Share stored therein, to generate a response M. Since the Private Key Share PKSi stored in each Tool 20$_1$', 20$_2$', 20$_3$' is the private key in toto, each Entity $A_1$, $A_2$, $A_3$, produces the same response, i.e., the response M, in step 108A where response M, for example, equals "2468" (see discussion below). Next, in step 108B the microprocessor 21 is operative, using the filtering instruction subset 24$_{FIS}$', to filter the response M generated by each such Tool 20$_i$ in accordance with the Boolean Expression of the prescribed Rule to produce the filtered response $M_i$ that is consistent with the Boolean Expression of the prescribed Rule (either a single filtered response for monotone access conditions or an ordered sequence of responses for non-monotone access conditions).

To facilitate a better understanding of the group authentication system 10' and method 100' described above, assume that the Verification Device 30 generates a random number M=2468 (base 2: 0010 0100 0110 1000) in step 102, and encrypts and transmits this random number M as a ciphertext challenge C to each of the Entities $A_1$, $A_2$, $A_3$ in steps 104 and 106, respectively. In step 108A, each Entity $A_1$, $A_2$, $A_3$ implements the group authentication instruction set 24$_{GAIS}$' stored in the non-volatile memory module 24' of each Tool 20$_1$', 20$_2$', 20$_3$', respectively, to decrypt the ciphertext challenge C, i.e., to generate the same response M where M equals the number 2468.

In step 108B, the response M of each Entity $A_1$, $A_2$, $A_3$ is filtered by execution of the filtering instruction subset 24$_{FIS}$' implemented by each Tool 20$_1$', 20$_2$', 20$_3$', respectively, to generate the response $M_i$, i.e., monotone access conditions, for each Tool 20$_1$', 20$_2$', 20$_3$' in accordance or consistent with the Boolean Expression of the prescribed Rule. For purposes of this descriptive example, the filtering instruction subset 24$_{FIS}$' is operative to convert the last two digits of the response $M_2$ of the Entity $A_2$ to 0 (zero) and to convert the first two digits of the response $M_3$ of the Entity $A_3$ to 0 (zero) Thus, the filtered response $M_1$ for Entity $A_1$ is "2468" (base 2: 0010 0100 0110 1000); the filtered response $M_2$ for Entity $A_2$ is "2400" (base 2: 0010 0100 0000 0000), and the filtered response $M_3$ for Entity $A_3$ is "0068" (base 2: 0000 0000 0110 1000).

Combining the filtered responses $M_1$, $M_2$, $M_3$ provides the following results:
response $M_1$=0010 0100 0110 1000, which equals the random number M generated by the Verification Device 30 in step 102, i.e., M=2468=0010 0100 0110 1000 (base 2), so that Group $G_1$, which comprises Entity $A_1$, is authorized to conduct or perform the Operation governed by the prescribed Rule set forth in eq. (5).

logical combination of response $M_2$ and response $M_3$ is:

$$\begin{array}{ll} 0010\ 0100\ 0000\ 0000 & (M_2) \\ \underline{0000\ 0000\ 0110\ 1000} & (M_3) \\ 0010\ 0100\ 0110\ 1000 \end{array}$$

which equals the random number M generated by the Verification Device 30 in step 102, i.e., M=2468=0010 0100 0110 1000 (base 2), so that Group $G_2$, which comprises the logical combination of Entities $A_2$ and $A_3$, is authorized to conduct or perform the Operation governed by the prescribed Rule set forth in eq. (5).

Group Authentication for Non-Monotonic Access Conditions:

The Benaloh-Leichter algorithm as well as much of the work on shared keys considers only monotone access structures; i.e., if a subset A' of A is allowed and A'⊂A", then A" is allowed. That is, if Alice and Bob together are authorized to conduct or perform an Operation, then Alice and Bob accompanied by Claire can perform the Operation. In some group authentication contexts the monotonicity condition is too permissive. For example, a Rule may prescribe that an Entity is authorized to conduct or perform a transaction by itself, or in combination with some other Entities, but not all other Entities, that are defined by a prescribed Rule. That is, Alice and Bob are authorized to perform the Operation if they are alone, but they are not authorized to perform the Operation in the presence of or if accompanied by Claire.

To illustrate this circumstance, consider an aircraft owned by a corporation that will seat three (3) passengers. The corporation's Rule regarding use of this corporate aircraft is as follows. The corporate aircraft can only be used by corporate employees and any trip must include at least two employees, at least one of whom must be a manager. For reasons of privacy and security, the corporation does not want to identify any employees on any trip on the aircraft.

Presume the corporation has five employees, {A, B, C, D, E}, of which two, employees A and B, are managers. The corporation's Rule regarding aircraft usage by its employees can be formulated as a Boolean Expression as follows:

(A AND B) OR ((A OR B) AND (C OR D OR E))   eq. (6)

Based upon this Boolean Expression of the prescribed Rule regarding employee usage of the corporation's aircraft, the following twenty-two (22) Groups of employees would be authorized to use the corporate aircraft in compliance with the prescribed Rule set forth in eq. (6):

AB,AC,AD,AE,BC,BD,BE(Groups of two employees)

ABC,ABD,ABE,ACD,ACE,ADE,BCD,BCE,BDE (Groups of three employees)

ABCD,ABCE,ABDE,ACDE,BCDE(Groups of four employees)

ABCDE(Group of all five employees)

Note that the Boolean expression of the prescribed Rule set forth as eq. (6) authorizes five(5) Groups of four employees, ABCD, ABCE, ABDE, ACDE and BCDE, to use the corporation's aircraft, i.e., all of the Groups ABCD, ABCE, ABDE, ACDE and BCDE would be successfully authenticated under the Boolean Expression of the prescribed Rule.

In a similar manner, the one group of five (5) employees would also be successfully authenticated under the Boolean Expression of the prescribed Rule. Yet these groups of four and five employees exceed the seating capacity of the aircraft, i.e., three passenger seats. Thus, in some circumstances monotone access conditions are not viable in view of one or more explicit or implicit constraints. This example illustrates a physical constraint, but it will be appreciated that the constraint could also have been a corporate rule/policy that no more than three of its employees would ever fly in the same aircraft. Such AND/OR Boolean Expressions define Groups in terms of Entities that are encompassed by prescribed Rules, but do not specifically exclude any such Entities. The exclusion of an Entity and/or Entities can be provided by allowing the logical operator NOT to be used in Boolean Expressions.

The present invention also provides a method of realizing non-monotone access conditions; i.e., conditions defined by a Boolean Expression of a prescribed Rule that includes the NOT operator, by providing each Entity of Groups defined by the prescribed Rule with a Private Key Share comprising an ordered sequence of values, which permits the generation of a response comprising an ordered sequence of values to the ciphertext challenge C by the Tool of each Entity in communication with the Verification Device. The $i^{th}$ value of the ordered sequence of values generated any such Entity to the ciphertext challenge C is computed using that Entity's $i^{th}$ value of the ordered sequence of values comprising its Private Key Share. If the ordered sequence of values comprising an Entity's Private Key Share does not include a value for any specific sequence, e.g., the $i^{th}$ sequence, the Tool of such Entity is operative to generate a non-zero default value for such specific sequence as part of the ordered sequence of values that comprise the response of such Entity.

For non-monotonic access structures, the Verification Device is operative to implement a response merging function to process the ordered sequences of values received as the responses from the Tools of the Entities in communication with the Verification Device. The response merging function generates a plurality of arithmetic sums, one arithmetic sum for the values of each sequence, derived from the ordered sequences of values received as the responses from the Entities in communication with the Verification Device, rather than the logical OR discussed above. The overall response r generated by the Verification Device is given by $$r=(r_1,r_2,\ldots,r_n)=(\Sigma r_{1j},\Sigma r_{2j},\ldots,\Sigma r_{nj})$$

where $r_1$ is the arithmetic sum of the of values of the first sequence, $r_2$ is the arithmetic sum of the of the values of the second sequence, etc (see Table 2 below wherein the arithmetic sum for any sequence is represented by the sum of the values of any row). If $r_i$=M for any i, then the Group is successfully authenticated.

In the corporate aircraft example described above, the Groups that should be encompassed by the Boolean Expression of the prescribed Rule, see eq. (6), are AB, AC, AD, AE, ACD, ABC, ABD, ABE, ACE, ADE, BC, BD, BE, BCD, BCE and BDE since only these Groups of Entities (corporate employees) comply with the limitation that the corporate aircraft is only capable of transporting three (3) passengers. Groups ABCD, ABCE, ABDE, ACDE, BCDE, and ABCDE would also satisfy the Boolean Expression of the prescribed Rule, but these Groups would not comply with the corporate aircraft limitation of three (3) passengers.

To form a NS cryptosystem for this Boolean Expression under non-monotone access conditions, select a set of prime numbers, P={$p_i$}, where $$P=\{2,3,5,7,11,13,17,19,23,29,31,37\},$$

such that the next prime p is greater than $\Pi\, p_i$, i.e., $$p=7420738134871,$$

and set the private key, s, to $$s=5642069$$

The public key of this cryptosystem is given by

| | |
|---|---|
| v[0] = 1042080239371 | v[6] = 6408801185994 |
| v[1] = 6961378167419 | v[7] = 6664307396372 |
| v[2] = 556387338943 | v[8] = 6792283659586 |
| v[3] = 6467374518496 | v[9] = 4009453191992 |
| v[4] = 6101909563954 | v[10] = 4858036635332 |
| v[5] = 7161849266528 | v[11] = 3535089085276 |

Table 1 shows the ordered sequence of values comprising the Private Key Share allocated to the Tool of each Entity to authenticate the sixteen (16) subsets of {A, B, C, D, E} described above for the corporate aircraft example. Using these Private Key Share value sequences in the above methods yields a Group Authentication protocol that satisfies the Boolean Expression of the corporate Rule, see eq. (6) above, and also takes into account the corporate aircraft seating limitation, i.e., number of passengers cannot exceed three (3).

TABLE 1

PRIVATE KEY SHARE VALUE SEQUENCES HELD BY EACH ENTITY'S TOOL

| Sequence Number | A | B | C | D | E | Groups(s) Authenticated |
|---|---|---|---|---|---|---|
| 1 | 2, 3, 5, 7, 11, 13 | 2, 3, 5, 7, 11, 13 | 17, 19, 23, 29, 31, 37 | 17, 19, 23, 29, 31, 37 | 17, 19, 23, 29, 31, 37 | AC, AD, AE, BC, BD, BE |
| 2 | 2, 3, 5, 7 | 11, 13, 17, 19 | 23, 29, 31, 37 | 23, 29, 31, 37 | 23, 29, 31, 37 | ABC, ABD, ABE |
| 3 | 2, 3, 5, 7 | | 11, 13, 17, 19 | 23, 29, 31, 37 | 23, 29, 31, 37 | ACD, ACE |
| 4 | | 2, 3, 5, 7 | 11, 13, 17, 19 | 23, 29, 31, 37 | 23, 29, 31, 37 | BCD, BCE |
| 5 | 2, 3, 5, 7 | | | 11, 13, 17, 19 | 23, 29, 31, 37 | ADE |

TABLE 1-continued

PRIVATE KEY SHARE VALUE SEQUENCES HELD BY EACH ENTITY'S TOOL

| Sequence Number | A | B | C | D | E | Groups(s) Authenticated |
|---|---|---|---|---|---|---|
| 6 |  | 2, 3, 5, 7 |  | 11, 13, 17, 19 | 23, 29, 31, 37 | BDE |
| 7 | 2, 3, 5, 7, 11, 13 | 17, 19, 23, 29, 31, 37 |  |  |  | AB |

The encryption of the random number 2919=101101100111 (base 2) using the public key is M=1073741824. The sequence of values generated by each Entity's Tool is given in the appropriate column of Table 2, i.e., each column identifies an ordered sequence of values for a particular Entity. An Entity's Tool provides the non-zero default value, e.g., one (1), if the Tool does not possess a Private Key Share value for any specific sequence (see, e.g., sequence number 3 in Table 1 wherein Entity B does not possess a Private Key Share value, sequence numbers 5 and 6 in Table 1 wherein Entity C does not possess a Private Key Share value, or sequence number 7 in Table 1 wherein Entities C, D, and E do not possess Private Key Share values).

TABLE 2

SEQUENCE VALUES GENERATED BY EACH ENTITY'S TOOL

| Sequence Number | A | B | C | D | E | Groups(s) Authenticated |
|---|---|---|---|---|---|---|
| 1 | 39 | 39 | 2880 | 2880 | 2880 | AC, AD, AE, BC, BD, BE |
| 2 | 7 | 96 | 2816 | 2816 | 2816 | ABC, ABD, ABE |
| 3 | 7 | 1 | 96 | 2816 | 2816 | ACD, ACE |
| 4 | 1 | 7 | 96 | 2816 | 2816 | BCD, BCE |
| 5 | 7 | 1 | 1 | 96 | 2816 | ADE |
| 6 | 1 | 7 | 1 | 96 | 2816 | BDE |
| 7 | 39 | 2880 | 1 | 1 | 1 | AB |

To facilitate a better understanding of the foregoing non-monotone Group Authentication protocol, several representative examples are presented below:

Scenario 1: Entities B and E want to use the corporate aircraft—

$r_1 = 39 + 2880 + 2919 = 2919$ $r_2 = 96 + 2816 = 2912 \neq 2919$ $r_3 = 01 + 2816 = 2817 \neq 2919$ $r_4 = 07 + 2816 = 2823 \neq 2919$ $r_5 = 01 + 2816 = 2817 \neq 2919$ $r_6 = 07 + 2816 = 2823 \neq 2919$ $r_7 = 2880 + 0001 = 2881 \neq 2919$ From the discussion above, it is known that the Entities B and E comprise a Group that is encompassed by the Boolean Expression of the prescribed Rule, see eq. (6). Response $r_1$ above equals M while responses $r_2$, $r_3$, $r_4$, $r_5$, and $r_6$ do not equal M. As noted above, as long as ri=M for any i, then that Group, i.e., Entities B and E, is successfully authenticated such that the Group comprising Entities B and E is authorized to use the corporate aircraft.

Scenario 2: Entities A, C, and D want to use the corporate aircraft—

$r_1 = 39 + 2880 + 2880 = 5799 \neq 2919$ $r_2 = 07 + 2816 + 2816 = 5639 \neq 2919$ $r_3 = 07 + 0096 + 2816 = 2919 = 2919$ $r_4 = 01 + 0096 + 2816 = 2913 \neq 2919$ $r_5 = 07 + 0001 + 0096 = 0104 \neq 2919$ $r_6 = 01 + 0001 + 0096 = 0098 \neq 2919$ $r_7 = 39 + 2880 + 0001 = 2920 \neq 2919$ From the discussion above, it is known that the Entities A, C, and D comprise a Group that is encompassed by the Boolean Expression of the prescribed Rule, see eq. (6). Response $r_3$ above equals M while responses $r_1$, $r_2$, $r_4$, $r_5$, and $r_6$ do not equal M. However, as noted above, as long as ri=M for any i, then that Group, i.e., Entities A, C, and D, is successfully authenticated such that the Group comprising Entities A, C, and D is authorized to use the corporate aircraft.

Scenario 3: Entities A, B, C, and D want to use the corporate aircraft $r_1 = 39 + 0039 + 2880 + 2880 = 5738 \neq 2919$ $r_2 = 07 + 0096 + 2816 + 2816 = 5735 \neq 2919$ $r_3 = 07 + 0001 + 0096 + 2816 = 2926 \neq 2919$ $r_4 = 01 + 0007 + 0096 + 2816 = 2913 \neq 2919$ $r_5 = 07 + 0001 + 0001 + 0096 = 0105 \neq 2919$ $r_6 = 01 + 0007 + 0001 + 0096 = 0105 \neq 2919$ $r_7 = 39 + 2880 + 0001 + 0001 = 2921 \neq 2919$ From the discussion above, it is known that Entities A and B, or Entity A or B in combination with Entity C and/or D, comprise Groups encompassed by the Boolean Expression of the prescribed Rule. The Entities A, B, C, and D, however, do not comprise a Group that is encompassed by the Boolean Expression of the prescribed Rule, see eq. (6), since the use of the corporate aircraft by four employees exceeds the seating capacity of the aircraft. Accordingly, none of the responses $r_i$ generated by the Verification Device equals M such that the Group comprising Entities A, B, C, and D is a non-authenticated Group, i.e., is prohibited from using the corporate aircraft.

Variations of this basic approach include using a different random number for each sequential challenge and having the non-zero default response be a non-zero random number rather than the number one (1).

A variety of modifications and variations of the above invention are possible in light of the foregoing teachings. For example, while the systems and methods of group authentication are described above in terms of the Naccache-Stern cryptosystem, it will be appreciated that the embodiment of the group authentication system and method disclosed above in connection with FIGS. 3, 3A, and 4 is not limited to the Naccache-Stern cryptosystem, but can utilize a variety of other public key cryptosystems. It is therefore to be understood that, within the scope of the appended claims, the present invention may be practiced other than as specifically described herein.

What is claimed is:

1. A method for group authentication using a public key cryptosystem that includes a public key and a private key, comprising the steps of:
   providing a Private Key Share to a Tool of each Entity of each Group encompassed by a Boolean Expression of a prescribed Rule based upon the private key;
   encrypting a random number using the public key of the public key cryptosystem to generate a ciphertext challenge at a Verification Device;
   conveying the ciphertext challenge to the Tool of each Entity in communication with the Verification Device;
   generating a response to the ciphertext challenge using the Private Key Share of the Tool of each Entity in communication with the Verification Device;
   transmitting the response generated by each Entity in communication with the Verification Device to the Verification Device;
   combining the responses received from the Entities in communication with the Verification Device;
   determining whether any combination of the responses equals the random number wherein any combination that equals the random number identifies an Authenticated Group and any combination that does not equal the random number identifies a non-authenticated Group; and
   effecting an apposite course of action with respect to an Operation governed by the prescribed Rule based upon the outcome of the determining step.

2. The group authentication method of claim 1 wherein the Private Key Share providing step comprises:
   splitting the private key of the public key cryptosystem in accordance with the Boolean Expression of the prescribed Rule to provide the Private Key Share allocated to the Tool of each Entity of each Group; and wherein the response generating step comprises:
   generating the response to the ciphertext challenge using the Private Key Share allocated to the Tool of each Entity in communication with the Verification Device.

3. The group authentication method of claim 2 wherein the one response generating step comprises:
   decrypting the ciphertext challenge using the Private Key Share allocated to the Tool of each Entity in communication with the Verification Device to generate the response for each Entity in communication with the Verification Device.

4. The group authentication method of claim 1 wherein the Private Key Share providing step comprises
   providing the private key of the public key cryptosystem to the Tool of each Entity of each Group encompassed by the Boolean Expression of the prescribed Rule as the Private Key Share; and wherein the response generating step comprises
   generating the response to the ciphertext using the private key of the public key cryptosystem allocated to the Tool of each Entity in communication with the Verification Device.

5. The group authentication method of claim 4 wherein the one response generating step comprises
   decrypting the ciphertext challenge using the private key of the public key cryptosystem to generate a response equal to the random number for each Entity in communication with the Verification Device; and
   filtering the random number response of each Entity in communication with the Verification Device in accordance with the Boolean Expression of the prescribed Rule to generate the response for each Entity in communication with the Verification Device.

6. The group authentication method of claim 1 wherein the Private Key Share providing step comprises:
   providing an ordered sequence of values as the Private Key Share to the Tool of each Entity of each Group in accordance with the Boolean Expression of the prescribed Rule; and wherein the response generating step comprises:
   generating an ordered sequence of values to the ciphertext challenge using the ordered sequence of values allocated to the Tool of each Entity in communication with the Verification Device as the response for the Tool; and wherein the transmitting step comprises:
   transmitting the ordered sequence of values generated by each Entity in communication with the Verification Device to the Verification Device; and wherein the combining step comprises:
   combining the values for each ordered sequence received from the Entities in communication with the Verification Device; and wherein the determining step comprises:
   determining whether any combination of sequence values equals the random number wherein any combination of sequence values that equals the random number identifies an Authenticated Group and any combination of sequence values that does not equal the random number identifies a non-authenticated Group.

7. The group authentication method of claim 6 wherein the step of generating the ordered sequence of values comprises:
   decrypting the ciphertext challenge using the ordered sequence of values allocated to each Tool of each Entity in communication with the Verification Device to generate the ordered sequence of values for each Entity in communication with the Verification Device.

8. The group authentication method of claim 6 further comprising the step of
   generating a non-zero default value as part of the ordered sequence of values generated by the Tool of each Entity in communication with the Verification Device for each sequence of the ordered sequence of values allocated to the Tool as the Private Key Share thereof that does not have a value.

9. The group authentication method of claim 1 wherein the Private Key Share providing step comprises:
   providing the private key of the public key cryptosystem to the Tool of each Entity of each Group encompassed by the Boolean Expression of the prescribed Rule as the Private Key Share; and wherein the response generating step comprises:

generating an ordered sequence of values using the private key allocated to the Tool of each Entity in communication with the Verification Device as the response of the Entity; and wherein the transmitting step comprises:

transmitting the ordered sequence of values of each Entity in communication with the Verification Device to the Verification Device; and wherein the logically combining step comprises:

combining the values of each ordered sequence received from the Entities in communication with the Verification Device; and wherein the determining step comprises:

determining whether any combination of sequence values equals the random number wherein any combination of the sequence values that equals the random number identifies an Authenticated Group and any combination of the sequence values that does not equal the random number identifies a non-authenticated Group.

10. The group authentication method of claim 9 wherein the response generating step comprises:

decrypting the ciphertext challenge using the private key allocated to the Tool of each Entity in communication with the Verification Device to generate a response that equals the random number for each Entity in communication with the Verification Device; and filtering the random number response of each Entity in communication with the Verification Device in accordance with the Boolean Expression of the prescribed Rule to generate the ordered sequence of values for each Entity in communication with the Verification Device.

11. The group authentication method of claim 1 wherein the public key cryptosystem is a Naccache-Stern cryptosystem.

12. The group authentication method of claim 1 wherein the effecting step comprises the step of authorizing each Authenticated Group to conduct the Operation governed by the prescribed Rule.

13. The group authentication method of claim 1 wherein the effecting step further comprises the step of prohibiting any non-authenticated Group from conducting the Operation governed by the prescribed Rule.

14. The group authentication method of claim 1 further comprising the step of generating the random number m.

15. A group authentication system using a public key cryptosystem that includes a public key and a private key, comprising:

a Verification Device having stored therein the public key; and a Tool for each Entity of each Group encompassed by a Boolean Expression of a prescribed Rule having stored therein a Private Key Share based upon the private key; wherein the Verification Device further includes a microprocessor operative to implement and manage functions of the Verification Device and instruction sets to implement the functions of the Verification Device including instructions for communicating with the Tool of each Entity in communication with the Verification device, instructions for executing a Group Authentication protocol with the Tool of each Entity in communication with the Verification Device, instructions for encrypting a random number using the public key stored in the Verification Device to generate a ciphertext challenge, instructions for conveying the ciphertext challenge to the Tool of each Entity in communication with the Verification Device, instructions for combining the responses received from the Entities in communication with the Verification Device, instructions for determining whether any combination of the responses equals the random number wherein any combination that equals the random number identifies an Authenticated Group and any combination that does not equal the random number identifies a non-authenticated Group, and instructions for effecting an apposite course of action with respect to an Operation governed by the prescribed Rule based upon the outcome of the determinations; and wherein the Tool of each Entity includes a microprocessor operative to implement and manage functions of the Tool and instructions sets to execute the functions of each the Tool including instructions for communicating with the Verification Device, instructions for executing the group authentication protocol, instructions for generating a response to the ciphertext challenge using the Private Key Share allocated to the Tool, and instructions for transmitting the response to the Verification Device.

16. The group authentication system of claim 15 wherein the Tool of each Entity of each Group has stored therein the private key of the public key cryptosystem split in accordance with the Boolean Expression of the prescribed Rule as the Private Key Share; and wherein the response generating instructions are operative to generate the response to the ciphertext challenge using the Private Key Share allocated to the Tool of each Entity in communication with the Verification Device.

17. The group authentication system of claim 16 wherein the response generating instructions are operative to decrypt the ciphertext challenge using the Private Key Share allocated to the Tool of each Entity in communication with the Verification Device to generate the response for each Entity in communication with the Verification Device.

18. The group authentication system of claim 15 wherein the Tool of each Entity of each Group encompassed by the Boolean Expression of the prescribed Rule has stored therein the private key of the public key cryptosystem as the Private Key Share; and wherein the response generating instructions are operative to generate the response to the ciphertext challenge using the private key of the public key cryptosystem allocated to the Tool of each Entity in communication with the Verification Device.

19. The group authentication system of claim 18 wherein the response generating instructions are operative to decrypt the ciphertext challenge using the private key of the public key cryptosystem to generate a response equal to the random number for each Entity; and filter the random number response in accordance with the Boolean Expression of the prescribed Rule to generate the response for each Entity in communication with the Verification Device.

20. The group authentication system of claim 15 wherein the Tool of each Entity of each Group encompassed by the Boolean Expression of the prescribed Rule has stored therein an ordered sequence of values as the Private Key Share in accordance with the Boolean Expression of the prescribed Rule; and wherein the response generating instructions are operative to generate an ordered sequence of values to the ciphertext challenge using the ordered sequence of values allocated to the Tool of each Entity in communication with the Verification Device as the response for the Tool; and wherein the transmitting instructions are operative to transmit the ordered sequence of values generated by each Entity in communication with the Verification Device to the Verification Device; and wherein the combining instructions are operative to combine the values for each ordered sequence received from the Entities in communication with the Verification Device; and wherein the determining instructions are operative determine whether any combination of sequence values equals the random number wherein any combination of sequence values that equals the random number identifies an Authenticated Group and any combination of sequence values that does not equal the random number identifies a non-authenticated Group.

21. The group authentication system of claim 20 wherein the response generating instructions are operative to decrypt the ciphertext challenge using the ordered sequence of values allocated to each Tool in communication with the Verification Device to generate the ordered sequence of responses for each Entity in communication with the Verification Device.

22. The group authentication system of claim 20 wherein the response generating instructions are further operative to generate a non-zero default value as part of the ordered sequence of values generated by the Tool of each Entity in communication with the Verification Device for each sequence of the ordered sequence of values allocated to the Tool as the Private Key Share thereof that does not have a value.

23. The group authentication system of claim 15 wherein the Tool of each Entity of each Group encompassed by the Boolean Expression of the prescribed Rule has stored therein the private key of the public key cryptosystem as the Private Key Share; and wherein the response generating instructions are operative to generate an ordered sequence of values using the private key allocated to the Tool of each Entity in communication with the Verification Device as the response of the Entity; and wherein the transmitting instructions are operative to transmit the ordered sequence of values of each Entity in communication with the Verification Device to the Verification Device; and wherein the logically-combining instructions are operative to combine the values of each ordered sequence received from the Entities in communication with the Verification Device; and wherein the determining instructions are operative to determine whether any combination of sequence values equals the random number wherein any combination of the sequence values that equals the random number identifies an Authenticated Group and any combination of the sequence values that does not equal the random number identifies a non-authenticated Group.

24. The group authentication system of claim 23 wherein the response generating instructions are operative to decrypt the ciphertext challenge using the private key allocated to the Tool of each Entity in communication with the Verification Device to generate a response equal to the random number for each Entity; and filter the random number response in accordance with the Boolean Expression of the prescribed Rule to generate the ordered sequence of values for each Entity in communication with the Verification Device.

25. The group authentication system of claim 15 wherein the public key cryptosystem is a Naccache-Stern cryptosystem.

26. The group authentication system of claim 15 wherein the instruction sets of the Verification Device further comprises instructions for generating the random number m.

27. The group authentication system of claim 15 wherein the instructions for effecting the course of action comprises instructions authorizing each Authenticated Group to conduct the Operation governed by the prescribed Rule.

28. The group authentication system of claim 15 where the instructions for effecting the course of action comprises instructions prohibiting any non-authenticated Group from conducting the Operation governed by the prescribed Rule.

29. In a system using a public key cryptosystem that includes a public key and a private key for group authentication between a Verification Device and one or more Groups encompassed by a Boolean Expression of a prescribed Rule, a Tool for each Entity of the one or more Groups, the Tool comprising:

a microprocessor operative to implement and manage functions of the Tool;

a Private Key Share based upon the private key; and instruction sets to implement the functions of the Tool including:

instructions for communicating with the Verification Device;

instructions for executing a Group Authentication protocol with the Verification Device, instructions for generating a response to a ciphertext challenge from the Verification Device using the Private Key Share wherein the ciphertext challenge is generated by the Verification Device by encrypting a random number using the public key, and instructions for transmitting the response of each Entity in communication with the Verification Device to the Verification Device;

wherein the Private Key Share equals the private key of the public key cryptosystem;

wherein the response generating instructions are operative to generate the response to the ciphertext challenge using the private key of the public key cryptosystem; and wherein the response generating instructions are operative to decrypt the ciphertext challenge using the private key of the public key cryptosystem to generate a response equal to the random number encrypted by the Verification Device to generate the ciphertext challenge; and filter the random number response in accordance with the Boolean Expression of the prescribed Rule to generate the response for each Entity in communication with the Verification Device.

30. In a system using a public key cryptosystem that includes a public key and a private key for group authentication between a Verification Device and one or more Groups encompassed by a Boolean Expression of a prescribed Rule, a Tool for each Entity of the one or more Groups, the Tool comprising:

a microprocessor operative to implement and manage functions of the Tool;

a Private Key Share based upon the private key; and instruction sets to implement the functions of the Tool including instructions for communicating with the Verification Device;

instructions for executing a Group Authentication protocol with the Verification Device, instructions for generating a response to a ciphertext challenge from the Verification Device using the Private Key Share wherein the ciphertext challenge is generated by the Verification Device by encrypting a random number using the public key, and instructions for transmitting the response of each Entity in communication with the Verification Device to the Verification Device;

wherein the Private Key Share equals the private key of the public key cryptosystem;

wherein the response generating instructions are operative to generate an ordered sequence of values using the private key allocated to the Tool of each Entity in communication with Verification Device as the Response of the Entity; and wherein the response generating instructions are operative to decrypt the ciphertext challenge using the private key allocated to the Tool of each Entity in communication with the Verification Device generate a response equal to the random number encrypted by the Verification Device to generate the ciphertext challenge; and filter the random number response in accordance with the Boolean Expression of the prescribed Rule to generate the ordered sequence of values for each Entity in communication with the Verification Device.

31. In a system using a public key cryptosystem that includes a public key and a private key for group authentication between a Verification Device and one or more Groups encompassed by a Boolean Expression of a prescribed Rule, a Tool for each Entity of the one or more Groups, the Tool comprising:

a microprocessor operative to implement and manage functions of the Tool;

a Private Key Share based upon the Private key; and instruction sets to implement the functions of the Tool including instructions for communicating with the Verification Device;

instructions for executing a Group Authentication protocol with the Verification Device, instructions for generating a response to a ciphertext challenge from the Verification Device using the Private Key Share wherein the ciphertext challenge is generated by the Verification Device by encrypting a random number using the public key, and instructions for transmitting the response of each Entity in communication with the Verification Device to the Verification Device;

wherein the public key cryptosystem is a Naccache-Stern cryptosystem.

32. In a system using a public key cryptosystem that includes a public key and a private key for group authentication between each Tool of each Entity of each Group encompassed by a Boolean Expression of a prescribed Rule in communication with a Verification Device, the Verification Device comprising:

the public key;

a microprocessor operative to implement and manage functions of the Verification Device; and instruction sets for implementing the functions of the Verification Device including instructions for communicating with the Tool of each Entity in communication with the Verification Device, instructions for executing a Group Authentication protocol with the Tool of each Entity in communication with the Verification Device, instructions for encrypting a random number using the public key stored in Verification Device to generate a ciphertext challenge, instructions for conveying the ciphertext challenge to the Tool of each Entity in communication with the Verification Device, instructions for receiving a response from the Tool of each Entity in communication with the Verification Device;

instructions for combining the responses received from Entities in communication with the Verification Device, instructions for determining whether any combination of responses equals the random number wherein any combination that equals the random number identifies an Authenticated Group and any combination that does not equal the random number identifies a non-authenticated Group, and instructions for effecting an apposite course of action with respect to an Operation governed by the prescribed Rule based upon the outcome of the determinations.

33. The Verification Device of claim 32 wherein the response from each Entity in communication with the Verification Device is an ordered sequence of values; and wherein the combining instructions are operative to combine the values for each ordered sequence received from the Entities in communication with the Verification Device; and wherein the determining instructions are operative to determine whether any combination of sequence values equals the random number.

34. The Verification Device of claim 32 wherein the effecting instructions further comprises instructions for authorizing each Authenticated Group to conduct the Operation governed by the prescribed Rule.

35. The Verification Device of claim 32 wherein the effecting instructions further comprise instructions for prohibiting any non-authenticated Group from conducting the Operation governed by the prescribed Rule.

36. The Verification Device of claim 32 wherein the instruction sets further comprises instructions for generating the random number.

37. The Verification Device of claim 32 wherein the public key cryptosystem is a Naccache-Stern cryptosystem.

38. A computer-readable medium containing an instruction set for enabling group authentication, using a public key cryptosystem that includes a public key and a private key, between each Tool of each Entity of each Group encompassed by a Boolean Expression of a prescribed Rule in communication with a Verification Device that includes the public key and a microprocessor to implement and manage the functions thereof, the instruction set operable to implement the functions of the Verification Device comprising:

instructions for communicating with the Tool of each Entity in communication with the Verification Device, instructions for executing a Group Authentication protocol with the Tool of each Entity in communication with the Verification Device, instructions for encrypting a random number using the public key stored in Verification Device to generate a ciphertext challenge, instructions for conveying the ciphertext challenge to the Tool of each Entity in communication with the Verification Device, instructions for receiving a response from the Tool of each Entity in communication with the Verification Device;

instructions for combining the responses received from Entities in communication with the Verification Device, instructions for determining whether any combination of responses equals the random number wherein any combination that equals the random number identifies an Authenticated Group and any combination that does not equal the random number identifies a non-authenticated Group, and instructions for effecting an apposite course of action with respect to an Operation governed by the prescribed Rule based upon the outcome of the determinations.

* * * * *